(12) United States Patent
Perkins

(10) Patent No.: US 8,864,158 B1
(45) Date of Patent: Oct. 21, 2014

(54) VEHICLE SIDE STEP

(71) Applicant: Boondock Side Steps LLC, Oklahoma City, OK (US)

(72) Inventor: Anthony Perkins, Oklahoma City, OK (US)

(73) Assignee: Boondock Side Steps LLC, Oklahoma City, OK (US)

( * ) Notice: Subject to any disclaimer, the term of this patent is extended or adjusted under 35 U.S.C. 154(b) by 0 days.

(21) Appl. No.: 14/066,359

(22) Filed: Oct. 29, 2013

Related U.S. Application Data

(60) Provisional application No. 61/719,827, filed on Oct. 29, 2012, provisional application No. 61/802,785, filed on Mar. 18, 2013.

(51) Int. Cl.
*B60R 3/00* (2006.01)
(52) U.S. Cl.
CPC ........................... *B60R 3/002* (2013.01)
USPC .............................................. 280/163
(58) Field of Classification Search
USPC ................................. 280/163–169
See application file for complete search history.

(56) References Cited

U.S. PATENT DOCUMENTS

| 5,358,268 | A | 10/1994 | Hawkins |
| 5,403,032 | A * | 4/1995 | Hellwig ................. 280/124.163 |
| 6,588,781 | B2 | 7/2003 | Pohill et al. |
| 6,588,782 | B2 * | 7/2003 | Coomber et al. ............. 280/163 |
| 7,413,204 | B2 * | 8/2008 | Leitner ........................ 280/163 |
| 7,416,232 | B2 | 8/2008 | Tier et al. |
| 7,566,064 | B2 * | 7/2009 | Leitner et al. ................. 280/166 |
| 7,717,445 | B2 | 5/2010 | Peterson et al. |
| 7,819,412 | B2 * | 10/2010 | McPherson .................. 280/163 |
| 7,874,565 | B2 * | 1/2011 | Duncan ........................ 280/163 |
| 8,448,967 | B2 | 5/2013 | Storer |

* cited by examiner

*Primary Examiner* — John Walters
*Assistant Examiner* — James Triggs
(74) *Attorney, Agent, or Firm* — Michael S. Young; Hall Estill Attorneys at Law

(57) ABSTRACT

An apparatus may include an elongated support member that when attached to a vehicle is substantially parallel to the longitudinal axis of the vehicle. A mounting bracket is fixedly attached to the elongated support member and configured for being fixedly attached to a vehicle. The elongated support member is fixedly attached to a stepping surface that provides a back surface to restrict motion of the foot of a user past the elongated support member, a first side surface to restrict motion of the foot of the user in a first direction, and a second side surface to restrict motion of the foot of the user in a second direction that opposes the first direction. The distance between the first side surface and the second side surface is substantially less than a length of the elongated support member.

21 Claims, 14 Drawing Sheets

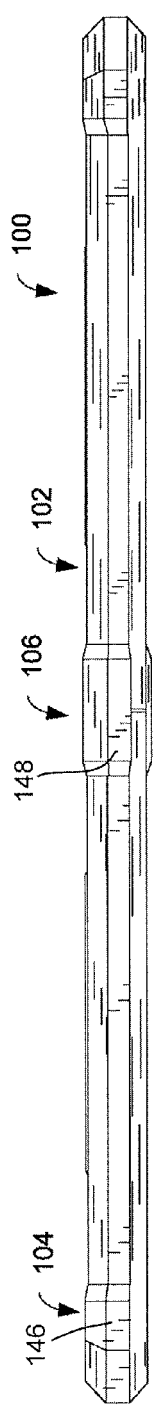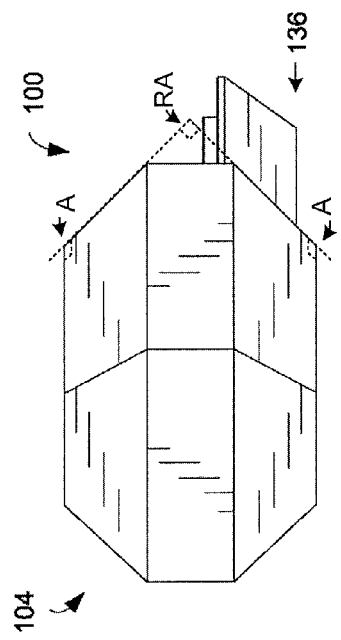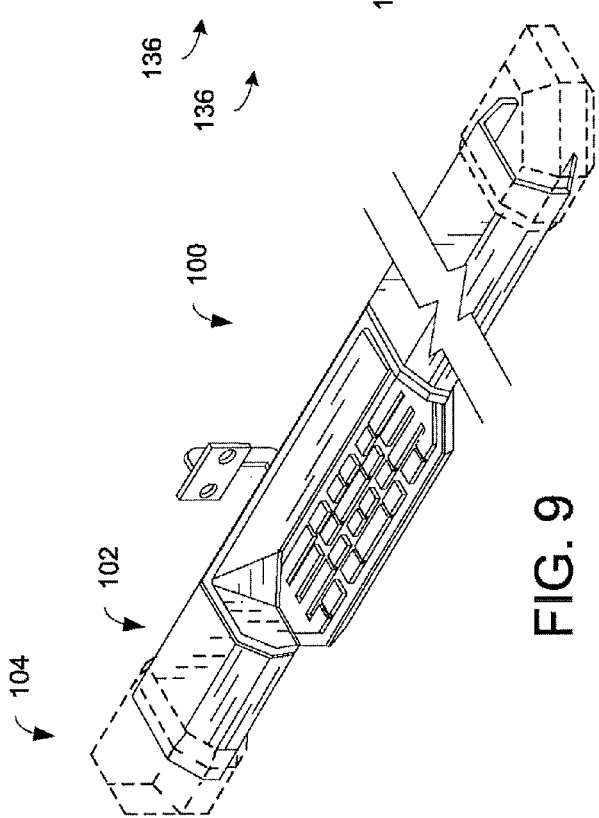

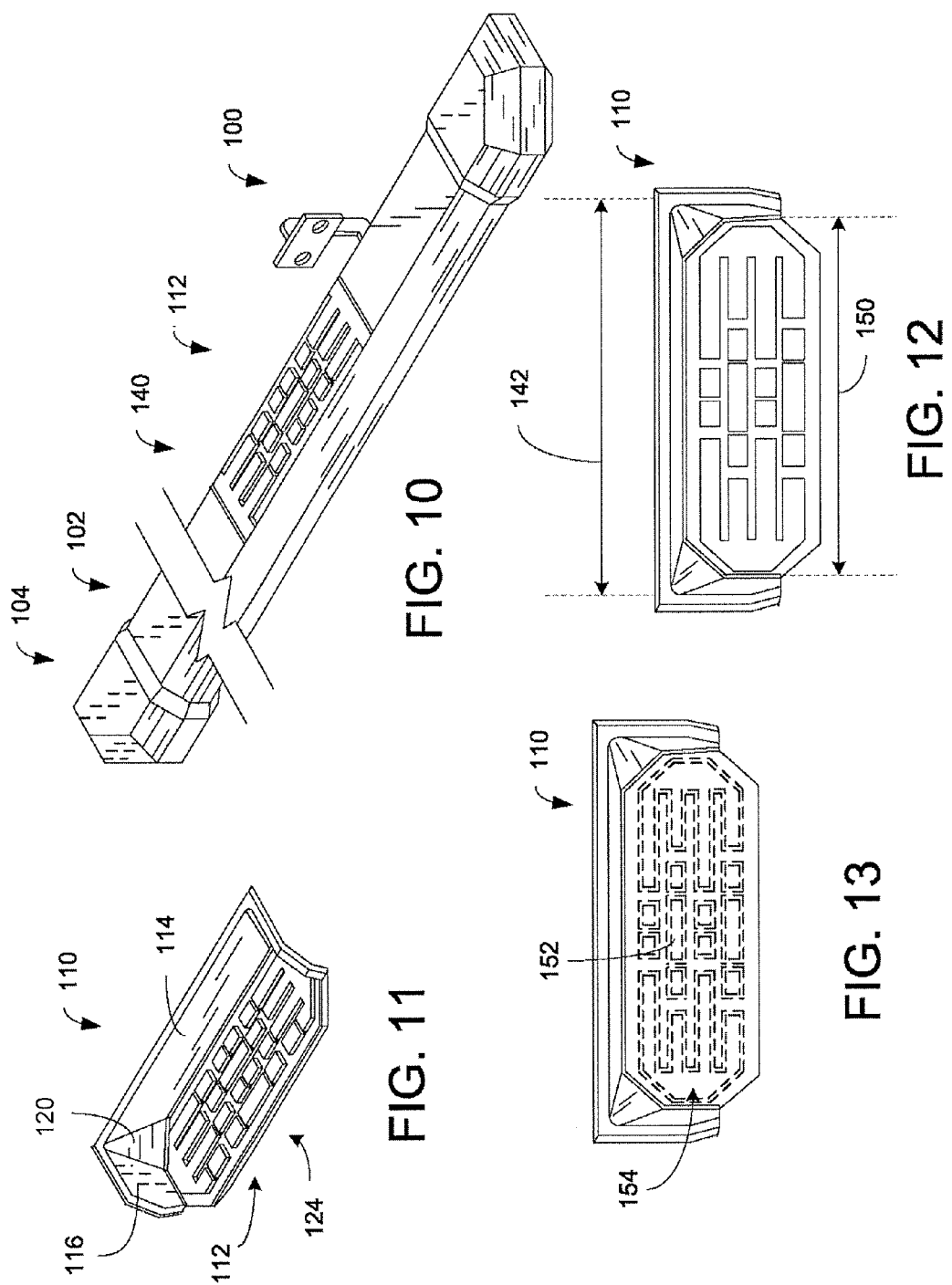

VEHICLE SIDE STEP

RELATED APPLICATIONS

This application claims priority to U.S. Provisional Patent Application No. 61/719,827 filed on Oct. 29, 2012, entitled "VEHICLE SIDE STEP," and to U.S. Provisional Patent Application No. 61/802,785 filed Mar. 18, 2013, entitled "RECESSED VEHICLE SIDE STEP", which are both incorporated by reference herein in their entireties.

BACKGROUND

Because the passenger compartment or storage area of some vehicles is comparatively high off the ground, some people find use of the passenger compartment or storage area inconvenient. Such inconvenient to use vehicles may include, but are not limited to, trucks, vans, and sport utility vehicles.

Accordingly, there is a continuing need for apparatus and methods that can help people use vehicles more conveniently.

SUMMARY

In accordance with various embodiments, an apparatus may include an elongated support member that when attached to a vehicle is substantially parallel to the longitudinal axis of the vehicle. A mounting bracket is fixedly attached to the elongated support member and configured for being fixedly attached to a vehicle. The elongated support member is fixedly attached to a stepping surface that provides a back surface to restrict motion of the foot of a user past the elongated support member, a first side surface to restrict motion of the foot of the user in a first direction, and a second side surface to restrict motion of the foot of the user in a second direction that opposes the first direction. The distance between the first side surface and the second side surface is substantially less than a length of the elongated support member.

These and various other features and advantages that characterize the present disclosure will be apparent upon reading the following detailed description and upon review of the associated drawings.

BRIEF DESCRIPTION OF THE DRAWINGS

FIG. 6 is a back elevational view of the exemplary side step of FIG. 2.

FIG. 7 is a first end elevational view of the exemplary side step of FIG. 2.

FIG. 8 is a second end elevational view of the exemplary side step of FIG. 2.

FIG. 9 is an isometric view of an exemplary side step in accordance with various embodiments of the present disclosure.

FIG. 10 is an isometric view of an exemplary side step in accordance with various embodiments of the present disclosure.

FIG. 11 is an isometric view of an exemplary step pad in accordance with various embodiments of the present disclosure.

FIG. 12 is a top plan view of the exemplary step pad of FIG. 11.

FIG. 13 is a bottom plan view of the exemplary step pad of FIG. 11.

DETAILED DESCRIPTION

Reference will now be made in detail to one or more examples of the disclosure depicted in the figures. Each example is provided by way of explanation of the disclosure, and not meant as a limitation of the present disclosure. For example, features illustrated or described as part of one embodiment may be used with another embodiment to yield still a different embodiment. Other modifications and variations to the described embodiments are also contemplated within the scope and spirit of the present disclosure.

The present disclosure concerns a side step for a vehicle, such as, but not limited to, trucks, vans, and sport utility vehicles. The vehicle can be any land vehicle. The side step may have one, two, three or more steps with stepping surfaces. For example, a side step may be configured to have one step to assist a user to access a passenger compartment or a storage area upon connection with the vehicle. In another example, a side step may be configured to have a first step to assist a user to access a passenger compartment and a second step to assist a user to access a storage area upon connection with the vehicle. In other example, a side step may be configured to have a first step to assist a user to access a first passenger compartment and a second step to assist a user to access a second passenger compartment, such as a crew cab, upon connection with the vehicle. In another example, a side step may be configured to have a first step to assist a user to access a first passenger compartment, a second step to assist a user to access a second passenger compartment, and third step to assist a user to access a storage area upon connection with the vehicle. Other configurations of steps in the side step are possible.

Accessing a passenger compartment, a storage area, or another portion of the vehicle may include entering or exiting the passenger compartment, the storage area or another portion of the vehicle by a user. Accessing the passenger compartment, a storage area, or another portion of the vehicle may include reaching into the passenger compartment, the storage area, or another portion of the vehicle to place or remove an object from the passenger compartment, the storage area, or another portion of the vehicle by the user.

The number of steps may be different on the two sides of the vehicle. The side step may be made from one or more elongated support members. Each elongated support member may provide one or more steps. Each step may be recessed in and protrude from each of the elongated support members. The elongated support members may be substantially straight or substantially linear; however, the elongated support members may be curvilinear. For example, the elongated support members may be curvilinear in the portion of the elongated support member hidden by an end cap or a joint cap in the assembled side step.

Figure 1:
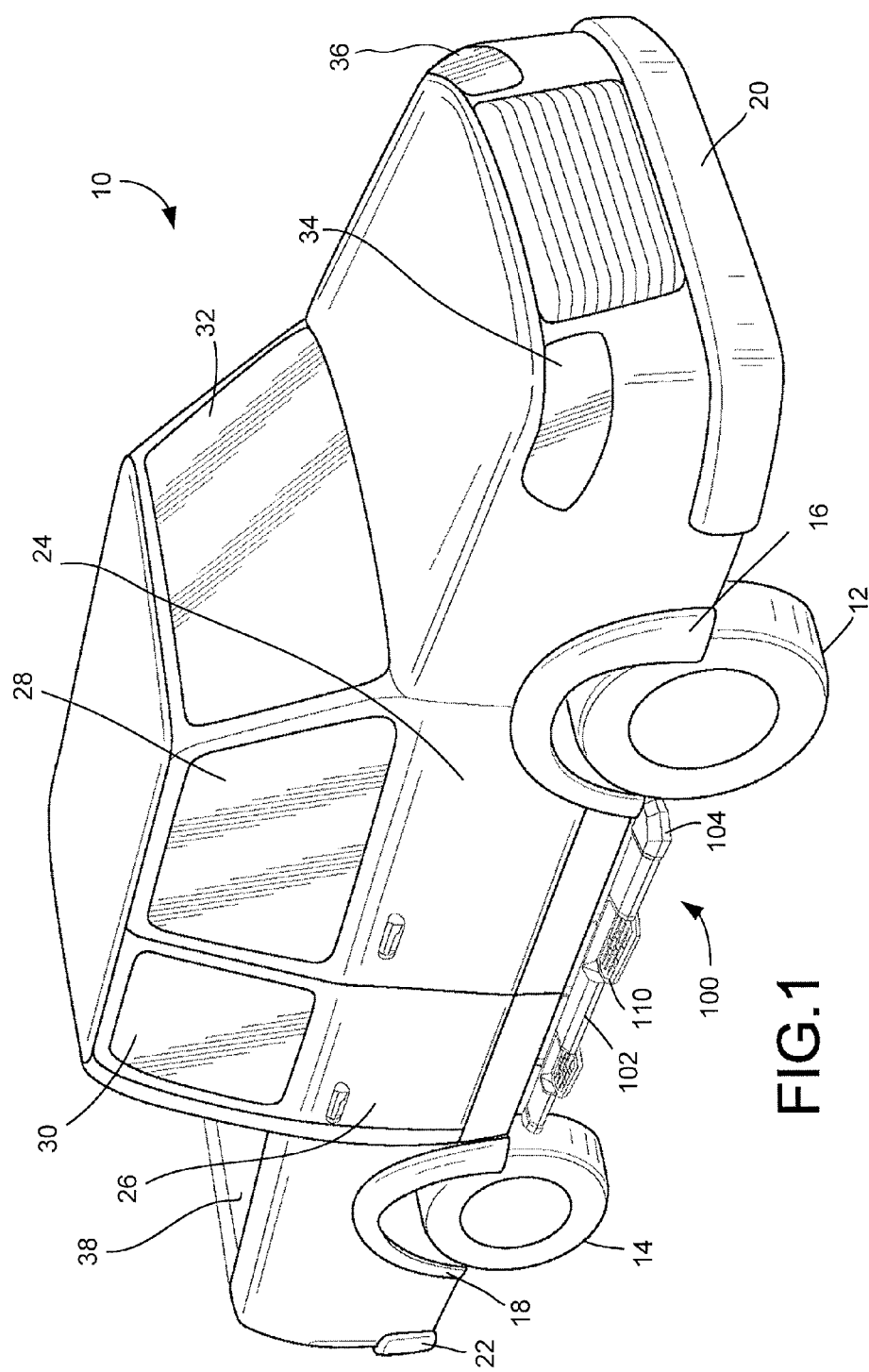
FIG. 1 is an isometric view of an exemplary side step fixedly attached to a vehicle in accordance with various embodiments of the present disclosure.

These and other features and benefits of the present disclosure can be understood beginning with a review of FIG. 1 that is an isometric view of an exemplary side step 100 fixedly attached to a vehicle 10. The side step 100 may include an elongated support member 102 (also known herein as a rail 102 or an elongated rail 102), an end cap 104, and a step pad 110. The elongated support member 102 is elongated in a direction substantially parallel to the longitudinal axis of the vehicle 10. The side step 100 is substantially horizontal when the vehicle 10 is supported by a substantially flat surface.

The vehicle 10 is shown as a truck by way of example, but not by way of limitation. The vehicle 10 may include any suitable structures such as, but not limited to, a front tire 12, a rear tire 14, a front fender 16, a rear fender 18, a front bumper 20, a rear bumper 22, a front door 24, a rear door 26, a front side window 28, a rear side window 30, a windshield 32, a front left light 34, a front right light 36, and a storage area 38. The side step 100 supports the step pad 110 to assist a user (not shown) in gaining access to a passenger compartment, the storage area 38, or another portion of the vehicle 10. The passenger compartment may be accessible to the user when the front door 24, the rear door 26, the front side window 28, or the rear side window 30 is open, for example.

The side step 100 may be between the front tire 12 and the rear tire 14 when the side step 100 is fixedly attached to the vehicle 10, as shown. The step pad 110 is lower, i.e. closer to the ground, and the bottom of the front door 24 or the rear door 26. The step pad 110 is lower than the storage area 38. It is contemplated that the vehicle may have more than a pair of front tires 12 and a pair of rear tires 14 and a pair of front doors 116 and a pair of rear doors 118. It is contemplated that the vehicle may have more or fewer doors and tires. In other embodiments, the side step 100 may be fixedly attached to the vehicle 10 forward of the front tire 12. In other embodiments, the side step 100 may be fixedly attached to the vehicle 10 rearward of the rear tire 12.

The side step 100 may extend substantially from near the rearward most edge of the front fender 16 to near the forward most edge of the rear fender 18. Other positions relative positions of the side step 100 to the vehicle 10 when fixedly attached are contemplated. Besides the side step 100 extending substantially the entire distance between the front fender 16 and the rear fender 18, the side step 100 may extend substantially the entire distance between the front tire 12 and the rear tire 14, while still allowing rotation and turning of the tires 12, 14.

Figure 2:
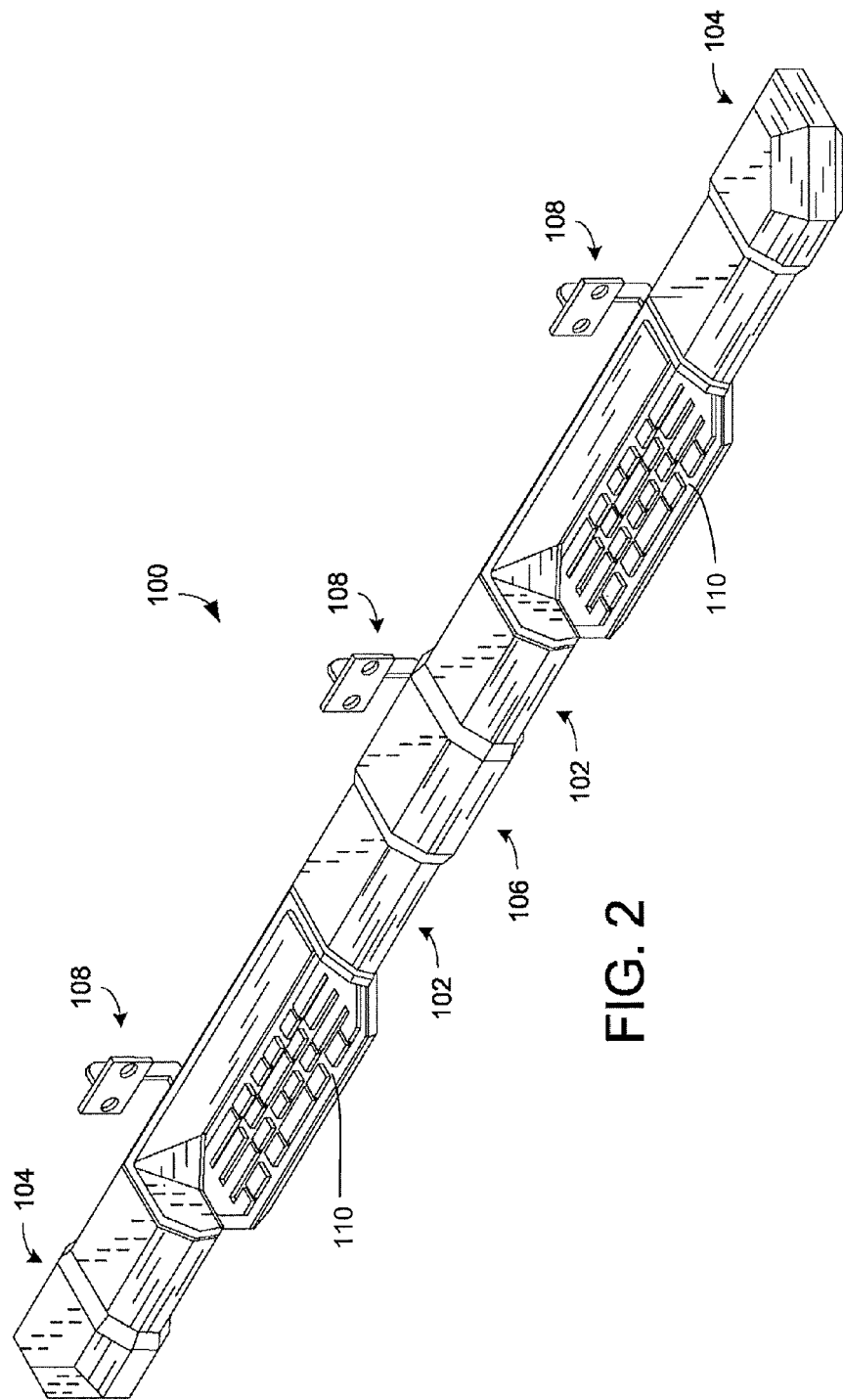
FIG. 2 is an isometric side view of an exemplary side step in accordance with various embodiments of the present disclosure.

FIGS. 2-8 show an exemplary side step 100. The side step 100 may include the elongated support member 102, the end cap 104, a joint cap 106, and a mounting bracket 108. Typically, but not by way of limitation, at least two mounting brackets 108 are used to fixedly attach the rail 102 to the vehicle 10. For example, three mounting brackets 108 are shown in FIGS. 1 and 2. However, one mounting bracket 108 may be used to fixedly attach the rail 102 to the vehicle 10.

The side step 100 may be include individual and separate components for any or all of the rail 102, the end cap 104, the joint cap 106 or the mounting bracket 108. The individual and separate components may yield a modular kit for the side step 100, which can be customized for each vehicle to which the side step 100 is connected. The modular kit could include components of different sizes, shapes, colors, materials, etc. to meet the needs of the user of the vehicle.

Alternatively, the side step 100 may include integral components, for example, but not by way of limitation, the rail 102 and the end cap 104 may be manufactured as one piece, the rail 102 and the joint cap 106 may be manufactured as one piece, and the rail 102, the end cap 104, and the joint cap 106 may be manufactured as one piece. When the components are integral, the components cannot be made individual and separate without destroying the functionality of the components for the intended use in the side step 100.

The rail 102, the end cap 104, the joint cap 106, the mounting bracket 108, the step pad 110, and other components of the side step 100 may be manufactured using any suitable material or technique. The side step 100 may be made of metal (such as, but not limited to, aluminum, steel, and stainless steel), plastic (such as, but not limited to thermoplastic resin, including styrenic compounds and acrylonitrile butadiene styrene, with fiber additive, such as glass fiber and/or mineral fiber), including any suitable combination of materials, such as, but not limited to, metal alloys. The techniques of making the side step 100 may include, but are not limited to, casting, extrusion, blow molding, including any suitable combination of techniques.

FIG. 2 shows the side step 100 made of a first elongated support member 102 and a second elongated support member 102, in contrast to the side step 100 of FIG. 1 that showed the side step 100 made of a single elongated support member with two separate step pads 110. The first elongated support member 102 may be substantially the same or substantially different elongated length of the second elongated support member 102. For example, but not by way of limitation, a modular kit including the first elongated support member 102 of a first length and the second elongated support member 102 of a second length that is substantially different from the first length may meet the needs of the user for fixedly attaching the side step 100 to the vehicle 10, when the front door 12 has different dimensions than the rear door 14 and therefore the positioning of the stepping surface 112 in relation to the front door 12 and the rear door 14 may be different for the first elongated support member 102 and the second elongated support member 102. Of course, a modular kit with the first elongated support member 102 of the same length as a second elongated support member 102 may meet the needs of the user, also.

One skilled in the art will also understand a potential manufacturing benefit of supplying the side step 100 with more than one elongated support member 102. The side step 100 may be manufactured on a machine that supports processing the elongated support member 102 that is of substantially shorter elongated length than the side step 100 that is made from more than one elongated support member 102. The machine that supports processing, such as bending or folding, the elongated support member 102 that is substantially shorter than the side step 100 that is assembled may be cheaper, more readily accessible, etc. for the manufacture of the elongated support member 102.

The joint cap 106 covers the connection between the first elongated support member 102 and the second elongated support member 102. The joint cap 106 may facilitate keeping materials, such as by example but not by way of limitation dirt, mud, and water, from entering the interior of the rail 102. Rather, the materials will be kept on the exterior of the rail 102.

Figure 3:
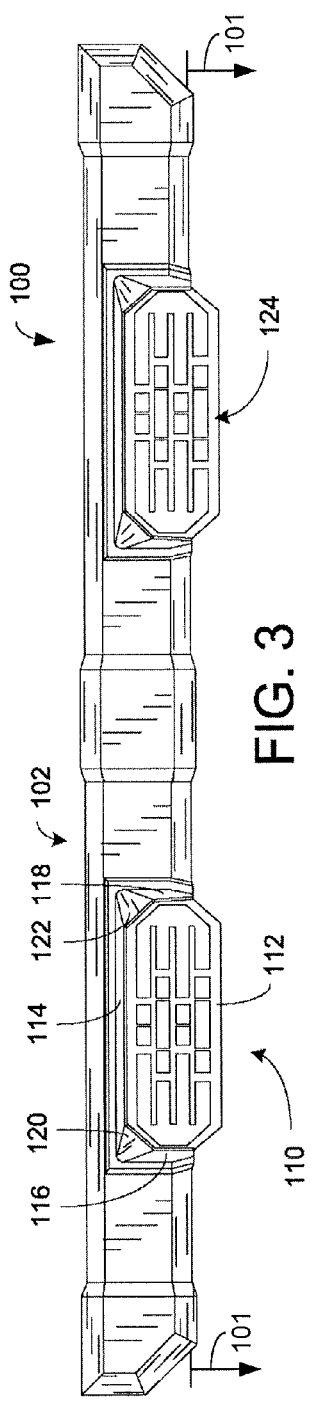
FIG. 3 is a top plan view of the exemplary side step of FIG. 2.

FIG. 3 illustrates in a top plan view that the elongated support member 102 of the side step 100 may include a step pad 110. The step pad 110 may include a stepping surface 112, a back surface 114, a first side surface 116, and a second side surface 118. There may be a first intervening surface 120 between the back surface 114 and the first side surface 116, and there may be a second intervening surface 122 between the back surface 114 and the second side surface 118.

The stepping surface 112 may be a substantially a planar surface, which may improve traction of a foot of the user on the stepping surface 112 when the user steps the user's foot on the stepping surface 112. The stepping surface 112 may be configured to be substantially horizontal, or parallel, to the ground on which the vehicle rests when the side step 100 is connected to the vehicle, which may improve traction of the foot of the user on the stepping surface 112 when the user steps the user's foot on the stepping surface 112, also.

Any, or all, of the back surface 114, the first side surface 116, the second side surface 118, the first intervening surface 120, and the second intervening surface 122 may be substantially perpendicular to the stepping surface 112, or may be canted, or set at an angle, from vertical as shown in FIG. 3. Any, or all, of the back surface 114, the first side surface 116, the second side surface 118, the first intervening surface 120, and the second intervening surface 122 may be a substantially planar surface or alternatively a substantially curvilinear surface.

The stepping surface 112 may include any suitable friction or traction surface to promote sure footing of a user stepping on the stepping surface 112. For example, but not by way of limitation, the stepping surface 112 may include a traction grooves 124, or other feature, that may act as a friction bearing surface that the user can step with reduced risk of the foot of the user slipping. The stepping surface 112 may be made of any suitable material or technique. For example, the stepping surface 112 may be made of plastic.

Of course as one skilled in the art would know, the step pad can have texture. For example, an injection molded plastic can have a chemical etching process applied to the plastic to create the texture. The texture would increase the coefficient of friction between the step pad 110 and the foot of the user. The step pad 110 that has been textured is in keeping with the disclosure providing a safe stepping place for the user to be able to access the vehicle 10 or reach another part of the vehicle 10 depending on how the step pad 110 is positioned in relation to the vehicle 10.

Figure 4:
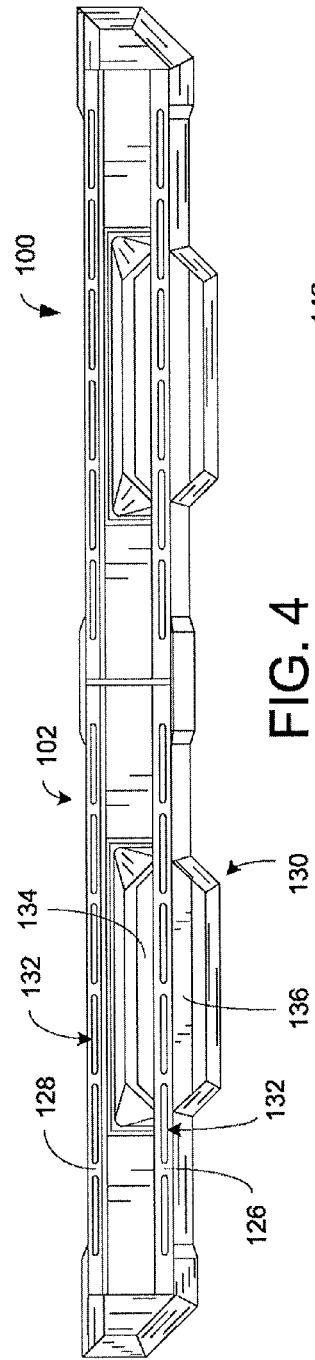
FIG. 4 is a bottom plan view of the exemplary side step of FIG. 2.

FIG. 4 provides a bottom plan view of the side step 100. The rail 102 may include a first connection guide rail (also known herein as first lip or front lip) 126, a second connection guide rail (also known herein as second lip or back lip (128, and a step pad support 130. The first connection guide rail 126 may be substantially lower, i.e., towards the ground, than the second connection guide rail 128 when the side step 100 is connected to the vehicle. Alternatively, the second connection guide rail 128 may be substantially lower, i.e., towards the ground, than the first connection guide rail 126 when the side step 100 is connected to the vehicle.

The first and second connection guide rails 126, 128 may be substantially parallel to each other. When the rail 102 is connected to the vehicle, the first and second connection guide rails 126, 128 may be substantially parallel to the ground on which the vehicle rests. Alternatively, the first and second connection guide rails 126, 128 may be substantially non-parallel to the ground or each other.

The first and second connection guide rails 126, 128 may each provide a connection guide 132, which may be also be known herein as a connection aperture 132. The connection guide 132 may be disposed on either, or both, of the first and second connection guide rails 126, 128 to provide the user installing, i.e. the installer, the side step 100 with a guide on where to place the mounting bracket in relation to the side step 100. The connection guide 132 may be custom positioned on the first and second connection guide rails 126, 128 based on properties of the side step 100, including the mounting bracket, and the vehicle 10 to which the side step 100 may be fixedly attached. The properties of the side step 100, including the mounting bracket 108, and the vehicle 10 accounted for in the custom position of the connection guide 132 may include, for example but not by way of limitation, size, shape, and number of connection guides.

A plurality of connection apertures 132 on each of the first and second connection guide rails 126, 128 may provide a universal connection mechanism of the rail 102 with the vehicle 10. The installer of the side step 100 could use the plurality of connection apertures 132 on each of the first and second connection guide rails 126, 128 to connect the mounting bracket 108 with the first and second connection guide rails 126, 128 to provide a customized position of the rail 102 in relation to the vehicle 10 without the need for the installer to be provided with a connection guide 132 customized for each vehicle 10. The first and second connection guide rails 126, 128 with the plurality of connection apertures 132 may be manufactured by laser cutting, shear, punch, extrusion, casting, or any other suitable manufacturing technique.

Alternatively, the first and second connection guide rails 126, 128 may each provide the connection guide 132 that is full rather than providing a through aperture, or hole.

The side step 100 may be connected to the vehicle 10 by any suitable fastening elements. For example, but not by way of limitation, the mounting bracket 108 may be connected to the vehicle by fasteners, such as but not limited to bolts, nuts, rivets, snap fit, and screws in conjunction with the plurality of connection apertures 132. When the connection guide 132 does not provide an aperture, a bonding agent, epoxy, clamp, welding, other suitable fastening elements that does not require an aperture may be used. Of course, fastening elements that require an aperture may be combined with fastening elements that do not require an aperture. Any suitable fastening elements can be used to connect any components of the side step 100 to each other and to the vehicle 10.

The fastening elements may be selected based on a variety of factors, including, but not limited to, strength of attachment desired, and materials used in the components of the side step 100. One skilled in the art would understand that different fastening elements may be selected depending on the type of material that is used in the side step 100. For example, welding to stainless steel can be challenging, such that the manufacturer of the side step 100 may decide that welding may not be used to connect stainless steel components. Stainless steel components may be more amenable being fixedly attached by fasteners, such as but not limited to bolts, nuts, rivets, snap fit, and screws. However, certain persons skilled in the art may use welding on stainless steel.

The mounting bracket 108 may be lower (closer to the ground) or higher (further from the ground) than the first and second connection guide rails 126, 128 when the rail 102 is connected to the vehicle. However by having the mounting bracket lower, i.e., below the first and second connection guide rails 126, 128, the mounting bracket may provide support to the rail 102. When the mounting bracket 108 is higher, i.e., the rail 102 is above the first or second connection guide rails 126, 128, such that the rail 102 is supported only by the fastening elements, and the rail 102 is not also supported by the mounting bracket when the rail 102 is connected to the vehicle 10, which may not provide a strong and stable connection between the rail 102 and the vehicle 10.

The stepping surface 112 may be supported by the step pad support 130. The step pad support may follow the contours of the step pad 110, or may provide support to a portion of the step pad, such as the stepping surface 112. The step pad support 130 provides support to the step pad 110, partially seen in FIG. 4 and also seen in FIGS. 23, 25, 29, and 30.

A medial step pad support portion 134 may be integral to the rail 102 or connected to the rail 102 by any suitable fastening elements. The medial step pad support portion 134 may provide support to the stepping surface 112 towards the vehicle when the side step 100 is connected to the vehicle 10.

A lateral step pad support portion 136 may be integral to the rail 102 or connected to the rail 102 by any suitable fastening elements. The lateral step pad support portion 136 may provide support to the stepping surface 112 away from the vehicle when the side step 100 is connected to the vehicle 10.

The lateral step pad portion 136 allows the step pad 110 to protrude from the volume of the rail 102 or areal surface of the rail 102. In FIG. 3, the step pad 110 can be seen to protrude from the rail 102 in the direction of arrows 101. Protrusion of the step pad 110 from the rail 102 allows the stepping surface 112 to be larger than would be possible by connection of the step pad 110 to the top of the rail 102. In addition, protrusion of the step pad 110 from the rail 102 allows the rail 102 to be smaller overall yet still provide enough room to support the foot of the user. By allowing the rail 102 to be smaller, the materials needed to produce the rail 102 may be less and therefore cheaper. In addition, the protrusion may provide a certain aesthetic that may appeal to the user.

Figure 5:
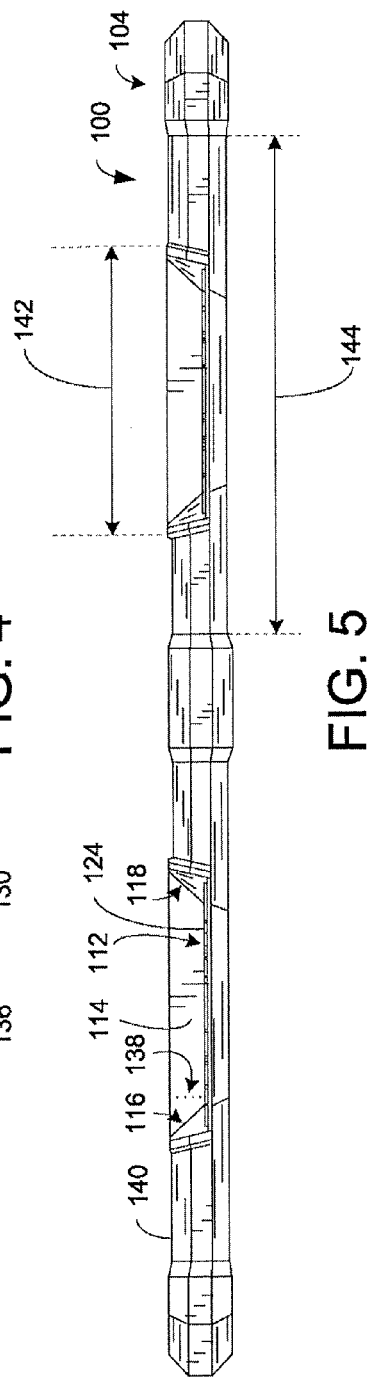
FIG. 5 is a front elevational view of the exemplary side step of FIG. 2.

FIG. 5 displays a front elevational view of the side step 100. This view provides an opportunity to visualize a recess 138 of the rail 102 and of the step pad 110 below a top surface 140 of the rail 102. The recess 138 may be any suitable dimension, such as by way of example but not limitation substantially greater than ½ inch, substantially greater than 1 inch, substantially greater than 1.5 inch, substantially greater than 2 inches. The recess 138 provides the opportunity to position the top surface 140 of the rail 102 in contacting adjacency or perhaps closely adjacent the vehicle, in which position the foot of the user cannot span the entire width of the rail 102.

The recess may permit the medial to lateral dimension of the stepping surface 112 or the traction grooves 124 to be greater than the medial to lateral dimension of the top 140 of the elongated support member 102, or the dimension of the stepping surface 112 or the traction grooves 124 may be greater than the medial to lateral dimension of the elongated support member 102, including the slanted surfaces of the rail 102. The medial to lateral dimension of the stepping surface 112 may be any suitable dimension, such as by way of example but not limitation substantially greater than 3 inches, substantially greater than 4 inches, substantially greater than 5 inches, substantially greater than 6 inches. The medial to lateral dimension of the stepping surface 112, traction grooves 124, the top surface 140 and the elongated support member 102 may be measured substantially parallel to a perpendicular line from the vehicle 10 to which the side step 100 is connected. The perpendicular line may be substantially parallel to the ground.

The clean aesthetic line created by the top surface 140 of the rail 102 in contacting adjacency or closely adjacent the vehicle 10 may present a problem for the user, because the width (i.e., perpendicular to the elongated dimension of the elongated support member 102) of the top surface 140 of the side step 100 may not provide enough surface area for the user to have sure footing when stepping on the side step, unless the side step is made unduly large and protruding from the vehicle 10 along the length of the side step 100.

As shown in FIG. 5, the back surface 114 is configured to inhibit the foot of the user from sliding, or stepping, past the rail 102 towards the vehicle 10. By fixedly attaching the side step 100 adjacent the vehicle 10, the foot of the user may be inhibited from sliding or stepping past the side step 100 due to there not being sufficient space between the side step 100 and the vehicle 10. The first and second side surfaces 116, 118 further serve to define limits of the stepping surface 112. The first side surface 116 restricts the foot of the user in a first direction, and the second side surface 118 restricts the foot of the user in a second direction that opposes the first direction. For example, when the side step 100 is fixedly attached to the vehicle 10, the first side surface 116 may act to restrict the foot of the user from sliding or stepping in a first direction, e.g., towards the front of the vehicle 10, while the second side surface 118 may act to restrict the foot of the user from sliding or stepping in a second direction, e.g., towards the rear of the vehicle 10. When canted, the back surface 114, the first side surface 116, and the second side surface 118 may serve to guide the foot of the user to the stepping surface 112 when the foot of the user steps on the back surface 114, the first side surface 116, the second side surface 118, the first intervening surface, the second intervening surface, or any combination of the same.

In addition, the canted surfaces, when present, may facilitate keeping the step pad 110 cleaner. Without sharp edges found by surfaces that meet at substantially perpendicular angles, the corners or meeting points between the various surfaces on the step pad 110 may be easier to keep clean. There are no sharp corners for dirt or other material to collect in. The canted surfaces may promote runoff from the step pad 110 of, by way of example and not limitation, water, mud, and debris.

The width 142 of the step pad 110 may be any suitable dimension. For example, the width 142 may be about 16 inches. The width 142 of the step pad 110 may be substantially less than a length 144 of the rail 102 between the end cap 104 and the joint cap 106. The width 142 of the step pad 110 can be substantially parallel to the length 144 of the rail 102. When the side step 100 includes only one of the rail 102, the width 142 of the step pad 110 may be substantially less than the length 144 of the rail 102 between the first end cap 104 and the second end cap 104. As with any of the other components of the side step 100, the rail 102 may be of any suitable dimension. For example but not by way of limitation, the rail 102 may be about 4 feet, with the length of the rail exposed between the end caps 104 or the end cap 104 and the joint cap 106, and the medial to lateral width of the rail 102 may be about 5-6 inches, more or less. The width 142 of the step pad 110 may be less than half of the length of the rail exposed between the end caps 104 or the end cap 104 and the joint cap 106.

FIG. 6 shows a back elevational view of the side step 100. The rail 102, the end cap 104, and the joint cap 106 may be seen. The end cap 104 provides a vertical surface 146, and the joint cap 106 provides a vertical surface 148. The vertical surface 146 of the end cap 104 and the vertical surface 148 of the joint cap 106 may be substantially perpendicular to the ground on which the vehicle 10 rests, when the rail 102 is fixedly attached to the vehicle 10.

FIGS. 7-8 illustrate a first side view and a second side view of the side step 100, respectively, which one skilled in the art will understand are mirror images. The lateral step pad support portion 136 is seen to provide the protrusion 109 from the rail 102. FIG. 8 shows that in some embodiments in accordance with the present disclosure, the end cap 104 and the side step 100, more generally, has an octagon end view. In certain embodiments particular angles will exist between the 8 surfaces. For example, RA in FIG. 8 identifies a right angle. From this right angle, one can calculate the other angles in the interior and exterior of the end cap 104 (and also the rail 102 and joint cap 106, for example). For example, angle A identified in FIG. 8 is approximately 135°. The angle between each of the 8 surfaces in an octagon totals 1080°, which can be approximately 135° for each of 8 angles in the octagon. Other degrees of angles between the 8 surfaces are contemplated. In addition, non-planar surfaces are also contemplated as discussed elsewhere.

FIG. 9 displays an exemplary side step 100 may include just one of the rail 102 with the step pad 110. The end cap 104 may any suitable form without necessarily matching a substantially planar pattern of rail 102. For example, but not by way of limitation, the end cap 104 may be curvilinear. The end caps 104 at the opposing ends of the rail 102 may be of different shapes, whether regular or irregular in shape.

FIG. 10 shows an exemplary side step 100 may include just one of the rail 102 with the stepping surface 112 applied to the top surface 140 of the rail 102. The end cap 104 may match the substantially planar pattern of rail 102.

FIGS. 11-17 provide an opportunity to review an exemplary step pad 110 in more detail. FIG. 11 illustrates an isometric view of the exemplary step pad 110. In this view, the stepping surface 112, the back surface 114, the first side surface 116, the first intervening surface 118, and the groove traction 124 can be seen.

FIG. 12 provides a top plan view of the step pad 110. A width 150 of the stepping surface 112 may be less than a width 142 of the step pad 110 due to the canted orientation of the back surface 114, the first side surface 116, the second side surface 118, first intervening surface 120, and the second intervening surface 122. The canted surfaces may enable the user to more easily place and remove the user's foot from the stepping surface 112. The foot may be effectively guided to and from the stepping surface 112. The canted orientation of the surfaces may facilitate drainage of material, for example but not by way of limitation, water, snow, and mud from the step pad 110.

The first intervening surface 120 and the second intervening surface 122 may also enable the user to more easily place and remove the user's foot from the stepping surface 112 without the foot being inhibited by a sharper angle that would be present between the back surface 114 and the first side surface 116 and the back surface 114 and the second side surface 118 if the first and second intervening surfaces were not present. The first intervening surface 120 and second intervening surface 122 may facilitate drainage of material, for example but not by way of limitation, water, snow, and mud from the step pad 110 by similar reasoning. Of course, the first and second intervening surfaces and the canted orientation of the back surface 114, the first side surface 116, the second side surface 118, first intervening surface 120, and second intervening surface 122 are optional.

FIG. 13 displays a bottom plan view of the step pad 110. The step pad 110 may provide a plurality of indentations 152 on a back surface 154 of the step pad 110 in the area of the traction grooves. By providing the indentations 152 during the manufacturing process, the thickness of the plastic, or other material, in the traction grooves can be uniform and the amount of material needed to make the step pad 110 can be minimized, which may reduce costs of manufacturing the step pad 110. When present, the indentations 152 may create a void between the step pad 110 and the medial and lateral step pad support portions (see 134, 136 in FIG. 4) when the top surfaces of the medial and lateral step pad support portions are substantially planar, or flat. Of course, one or both the top surfaces of the medial and lateral step pad support portions may have raised portions that correspond to the some, or all, of the plurality of indentations 152 to support the back surface 154.

Figure 14:
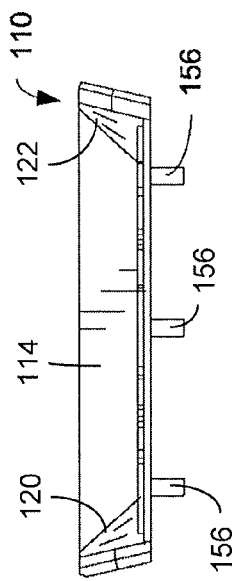
FIG. 14 is a front elevational view of the exemplary step pad of FIG. 11.

FIG. 14 shows a front elevational view of the step pad 110. The step pad 110 may provide a connection post 156 that connects with a corresponding aperture in the rail 102. The back surface 114, the first intervening surface 120, and the second intervening surface 122 are seen.

Figure 15:
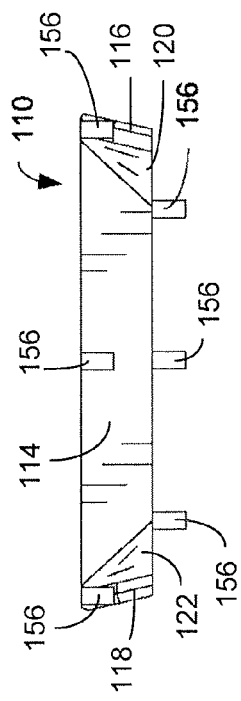
FIG. 15 is a back elevational view of the exemplary step pad of FIG. 11.

FIG. 15 illustrates shows a back elevational view of the step pad 110. Again, the step pad 110 may provide the connection post 156 that connects with the corresponding aperture in the rail 102. The backside or non-stepping surfaces of the back surface 114, first side surface 116, second side surface 118, first intervening surface 120, and second intervening surface 122 are shown.

The connection post 156 may be one of a plurality of connection posts 156. The connection posts 156 may be of any suitable size, shape, configuration, etc. The connection posts 156 are optional. For example, if the step pad 110 is integral to the rail 102, then the connections post 156 need not be present. If the step pad 110 is not integral to the step pad 110, then the connection posts 156 may not be necessary if the step pad 110 is connected to the rail with any suitable fastening elements.

Figure 16:
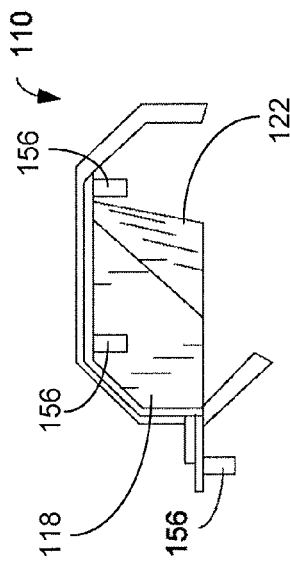
FIG. 16 provides a side elevational view of the exemplary step pad of FIG. 11.

FIG. 16 provides a side elevational view of the step pad 110. The plurality of connection posts 156 may be seen. The second side surface 118 and the second intervening surface 122 may also be seen.

Figure 17:
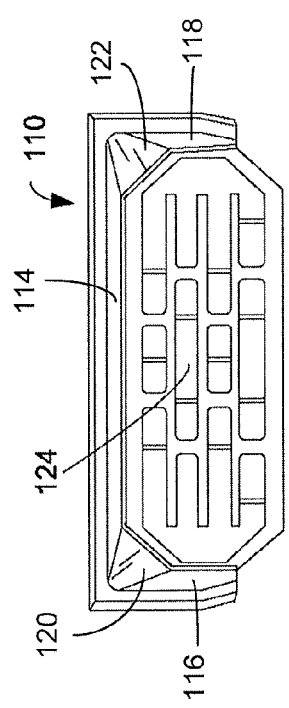
FIG. 17 is a top plan view of exemplary traction grooves in accordance with various embodiments of the present disclosure.

FIG. 17 displays a top plan view of exemplary traction grooves 124. The stepping surfaces of the back surface 114, first side surface 116, second side surface 118, first intervening surface 120, and second intervening surface 122 are shown.

Figure 18:
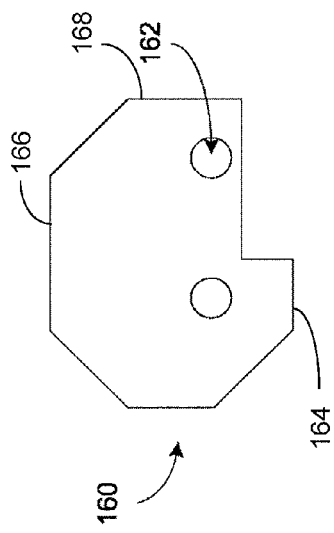
FIG. 18 is a side elevational view of a connection portion in accordance with various embodiments of the present disclosure.

FIG. 18 shows a side view of an exemplary connection portion 160. The connection portion 160 may be present on any combination of the rail 102 (not shown), the end cap 104 (not shown), and the joint cap 106 (not shown). The connection portion 160 may include an aperture 162, which is optional. The connection portion 160 may provide a plurality of apertures 162 that extend all the way through the connection portion 160. For orientation purposes, the skilled artisan will understand that edge 164 would correspond with the front lip portion of the rail 102, edge 166 would correspond with the top surface 140 of the rail 102, and edge 168 would correspond with the vertical surface 146 of the end cap 104 or the vertical surface 148 of the joint cap 106.

Figure 19:
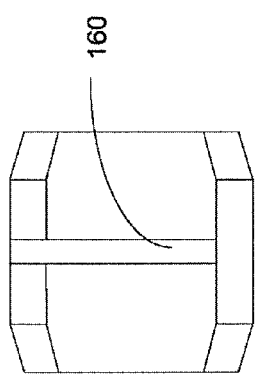
FIG. 19 is a bottom plan view of a joint cap in accordance with various embodiments of the present disclosure.

FIG. 19 illustrates a bottom plan view of an exemplary joint cap 106 that includes the connection portion 160. The connection portion 160 is shown symmetrically in the joint cap 106, but the connection portion 160 may be asymmetrically aligned.

The skilled artisan will understand that the connection portion 160 may be used to provide structural stability at any position in the rail 102, the end cap 104, the joint cap 106, or any combination of the rail 102, the end cap 104, and the joint cap 106. The connection portion 160 may be fixedly attached to the rail 102, the end cap 104, or the joint cap 106 by any suitable fastening elements.

The connection portion 160 of the end cap 104 may be fixedly attached to the connection portion 160 of the rail 102 by any suitable fastening elements. The connection portion 160 of a first rail 102 may be fixedly attached to the connection portion 160 of a second rail 102 by any suitable fastening elements. The connection portion 160 of the joint cap 106 may connect the joint cap 106 to the side step 100 between the connection portion 160 of a first rail 102 may be fixedly attached to the connection portion 160 of a second rail 102 by any suitable fastening elements.

Figure 20:
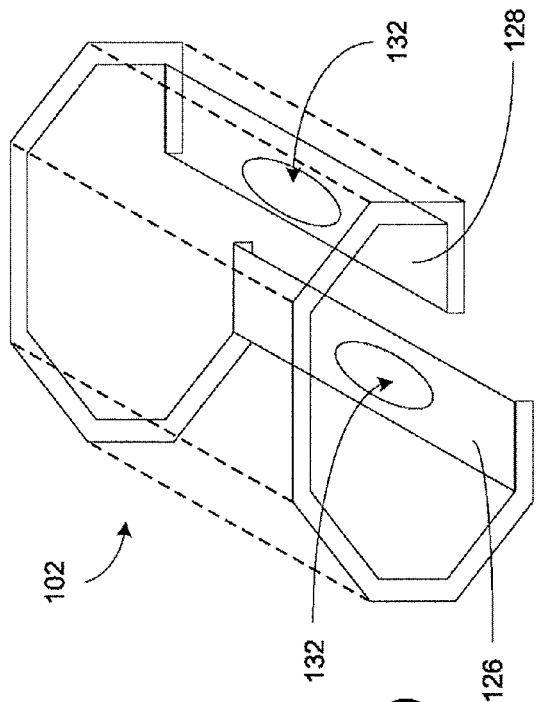
FIG. 20 is an isometric cutaway view a rail in accordance with various embodiments of the present disclosure.

FIG. 20 provides an isometric cutaway view of the rail 102 that shows the first connection guide rail 126 with the connection aperture 132 and the second connection guide rail 128 with the connection aperture 132. The rail 102, the end cap (see 104 in FIG. 2), and the joint cap (see 106 in FIG. 2) are shown with substantially planar surfaces. However, the rail 102, the end cap 104, and the joint cap 106 may have any combination of planar and curvilinear surfaces. In addition, the first connection guide rail 126 and the second connection guide rail 128 are shown as free edges, which is optional. The rail 102 can be a generally closed cylindrical type structure with the first and second connection guide rails 126, 128 on free edges. For example, but not by way of limitation, the ends of the rail 102 may be generally closed by attaching the connection portion 160 to the ends of the rail 102 by any suitable fastening elements. There may be one, two, or more connections between the mounting bracket 108 and the rail 102.

Figure 21:
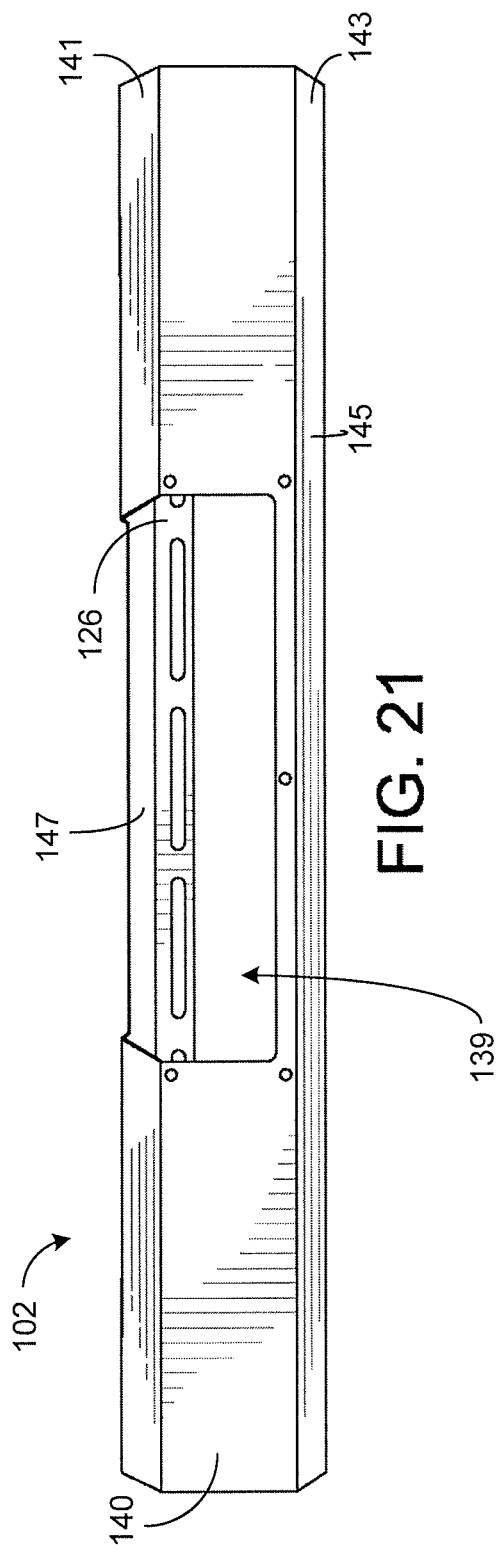
FIG. 21 is a top view of a rail in accordance with various embodiments of the present disclosure.

FIG. 21 shows a top plan view of the rail 102. The top surface 140 may be continuous with a top forward slanted surface 141, and the top surface 140 may be continuous with a top back slanted surface 143. The top surface 140 may provide a plurality of apertures 145, such as three apertures 145 medially and two apertures 145 laterally as shown. The apertures 145 are positioned and dimensioned to allow passage of the connection posts 156 (not shown) of the step pad 110 to fixedly attach the step pad 110 (not shown) to the rail 102. Also seen in this view are a bottom forward slanted surface 147 and the front lip 126.

The top surface 140 further provides a step pad aperture 139 that is configured to receive the step pad 110. The step pad aperture 139 provides space in the rail 102 for the recess 138 of the rail 102. As shown throughout the present disclosure, a portion of the step pad 110 can be in the recess 138 of the rail 102, and a different portion of the step pad 110 can protrude from the rail 102; a portion of the stepping surface 112 can be in the recess 138 of the rail 102, and a different portion of the stepping surface 112 can protrude from the rail 102; and a portion of the step pad support 130 can be in the recess 138 of the rail 102, and a different portion of the step pad support 130 can protrude from the rail 102.

Figure 22:
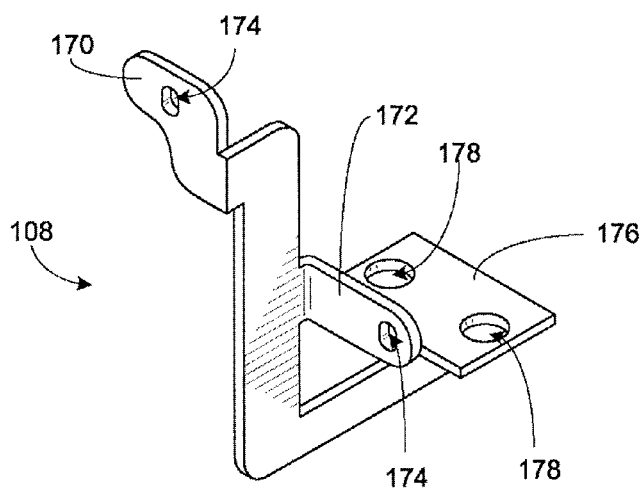
FIG. 22 is an isometric bottom view of a mounting bracket in accordance with various embodiments of the present disclosure.
Figure 23:
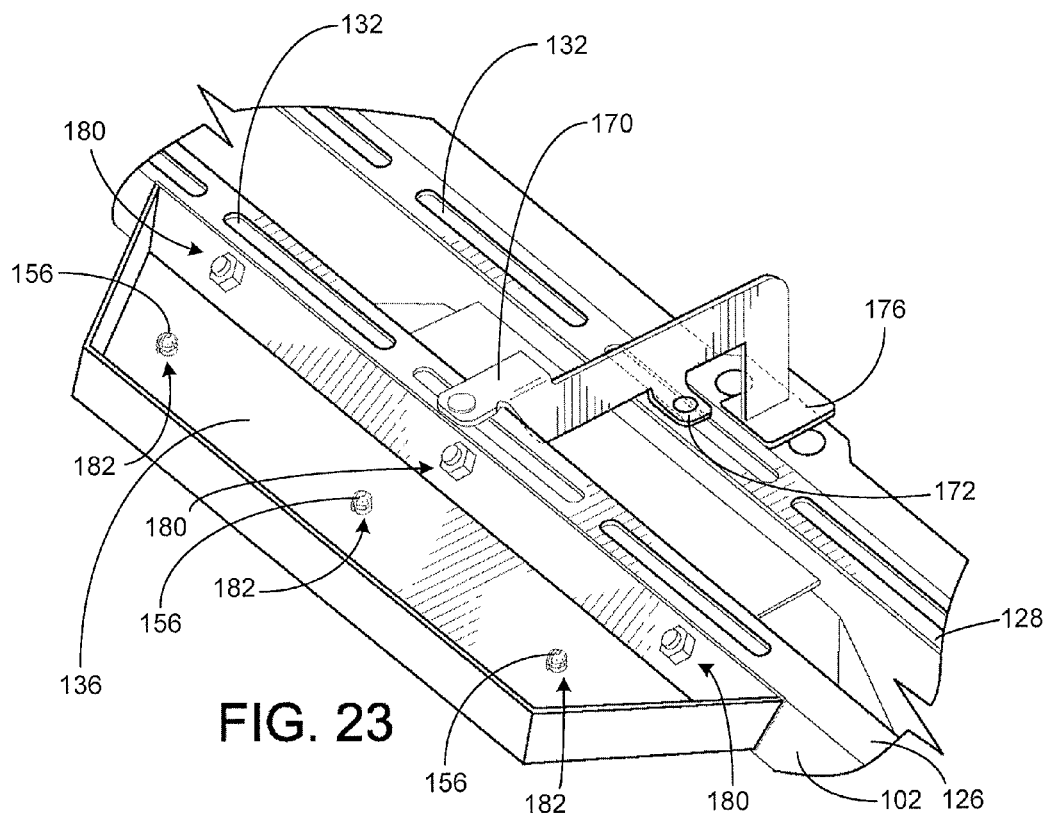
FIG. 23 is an isometric bottom view of a side step fixedly attached to a mounting bracket in accordance with various embodiments of the present disclosure.

FIG. 22-23 displays isometric bottom view of the mounting bracket 108 in accordance with various embodiments of the present disclosure. The mounting bracket 108 may provide a first connection tab 170 and a second connection tab 172. The first connection tab 170 and the second connection tab 172 may each provide a connection aperture 174. Because the first and second connection tabs 170, 172 may be fixedly attached to the first connection guide rail 126 and second connection guide rail 128, this end of the mounting bracket 108 may be considered universal. Of course, the mounting bracket 108 may be fixedly attached to the rail 102 and the vehicle 10 by any suitable fastening elements.

On the other hand, the mounting bracket 108 may provide a vehicle connection end 176 that may provide one or more connection apertures 178. The vehicle connection end 176 may be customized, as needed, to connect the mounting bracket 108 to the vehicle 10. Alternatively, the vehicle connection end 176 may universal and the vehicle 10 is prepared by drilling, etc. as needed to accommodate the vehicle connection end 176. There may be any number of connections between the mounting bracket 108 and the rail 102, and the mounting bracket 108 and the vehicle 10. There needs to be at least one attachment between the mounting bracket 108 and the rail 102 and at least one attachment between the mounting bracket 108 and the vehicle 10.

The lateral step pad support portion 136 may be fixedly attached to the rail 102 by one or more fasteners 180, such as a bolt and nut. Three fasteners 180 are shown in FIG. 23, but one, two, three, or more fasteners may be used. Besides using the fasteners, the lateral step pad portion 136 may be fixedly attached to the rail 102 by any other suitable fastening elements, for example but not by way of limitation, welding.

The connection post 156 may go through an aperture of the lateral step pad support portion 136, as shown. The connection post 156 may stay in relative position to and in attachment with the lateral support portion 136 through a snap fit. In addition, the connection post 156 may in relative position to and in attachment with the lateral support portion 136 through use of a clip 182 or other suitable fastening elements.

Figure 24:
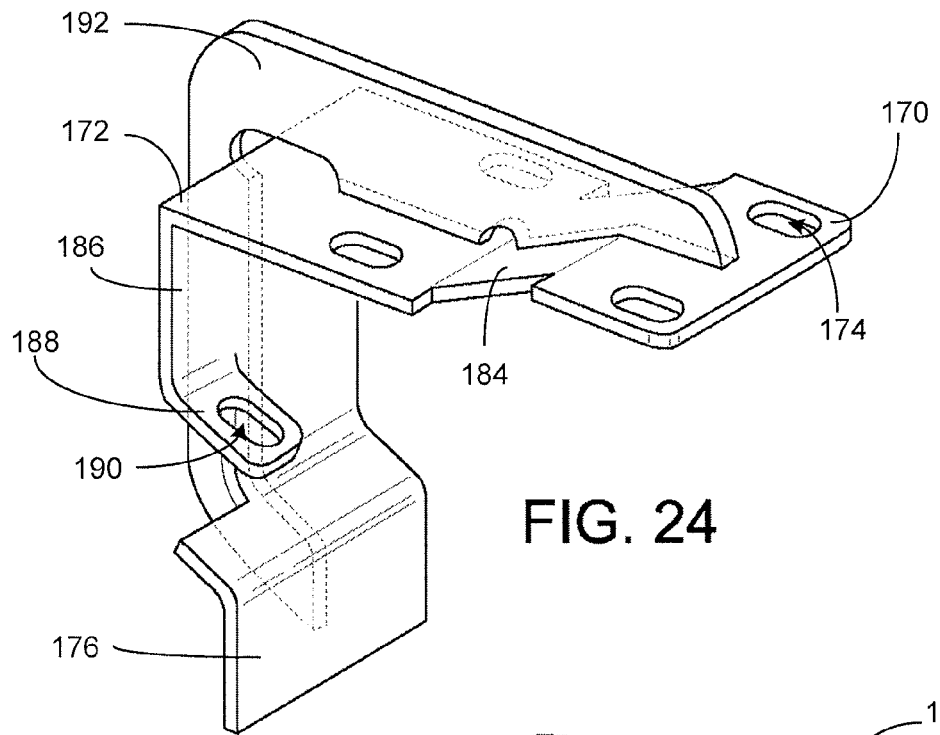
FIG. 24 is an isometric view of a mounting bracket in accordance with various embodiments of the present disclosure.
Figure 25:
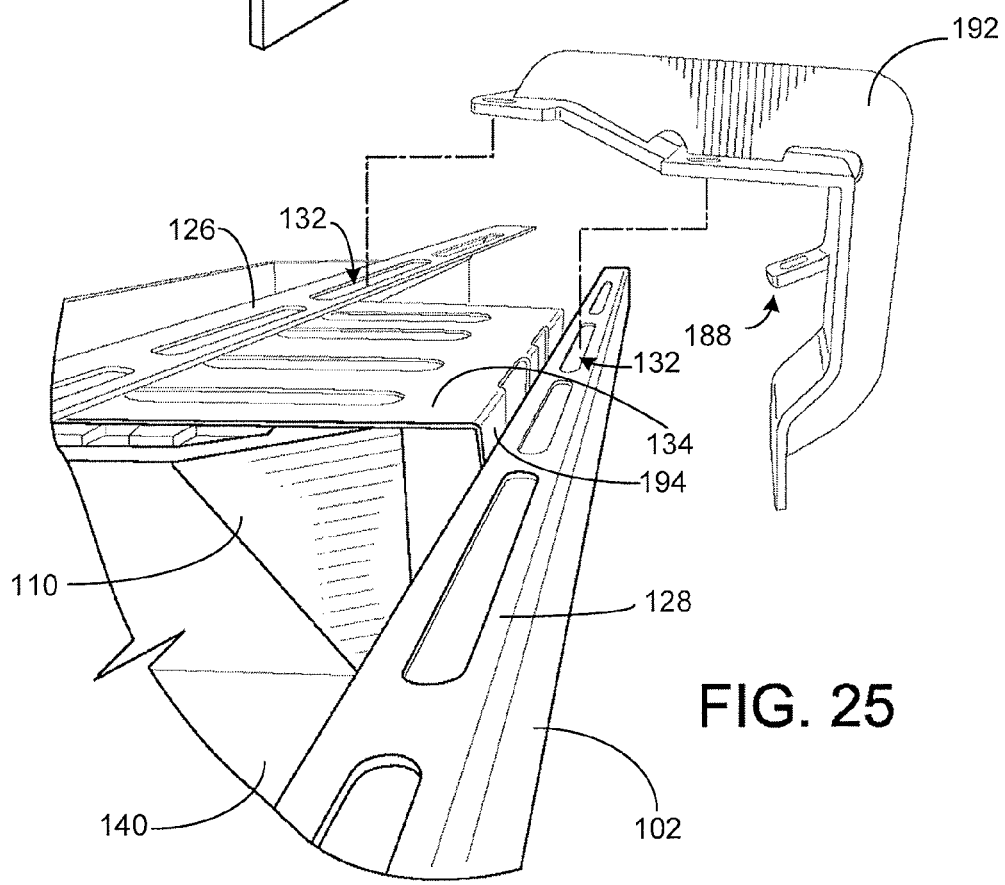
FIG. 25 is an isometric bottom view of an exploded view of a side step and a mounting bracket in accordance with various embodiments of the present disclosure.

FIGS. 24 and 25 show another exemplary mounting bracket 108. The first connection tab 170 and the second connection tab 172 are connected by a connection member 184. A surface 186 providing the first connection tab 170, the second connection tab 172 and the connection member 184 may extend to provide an arm 188 that can be fixedly attached to the rail 102 by any suitable fastening elements. The arm 188 may be bent or folded to follow the contour of the rail 102. The arm 188 may provide an aperture 190 through which a fastener, such as bolt and nut, can secure the mounting bracket 108 to the rail 102. Alternatively or in combination with the fastener, other suitable fastening elements such as, by way of example and not limitation, welding can be used to fixedly attach the arm 188 to the rail 102. The arm 188 may be contactingly adjacent the rail 102. The arm 188 may help prevent rotation of the top surface 140 of the rail 102 away from the vehicle 10 when the user steps on the step pad 110.

The surface 184 can further extend to provide the vehicle connection end 176 that may be connected to the vehicle 10 by a suitable fastening elements. For example, but not by way of limitation, the vehicle connection end 176 may be fixedly attached to the vehicle 10 by welding. Alternatively or in combination with welding or other suitable fastening elements, the vehicle connection end 176 may be provided with apertures (e.g., see connection aperture 178 in FIG. 22) for connection by fasteners, such as but not by way of limitation, bolt and nut.

A spine 192 may be fixedly attached to the surface 186 by any suitable fastening elements, for example but not by way of limitation welding. The spine 192 may provide the mounting bracket 108 with structural stability, and the spine 192 may provide further surface for connection between the mounting bracket 108 and the vehicle 10.

FIG. 25 provides an opportunity to see an extension 194 of the medial step pad support portion 134 that extends towards the top surface 140 of the rail 102. The extension 194 is fixedly attached to the top surface 140 by any suitable fastening elements. The medial step pad support portion 134 provides support to the step pad 110, which is shown in backside or non-stepping surface. The medial step pad support portion 134 may reduce flexion of the step pad 110, such as when the step pad 110 supports the weight of the user.

Figure 26:
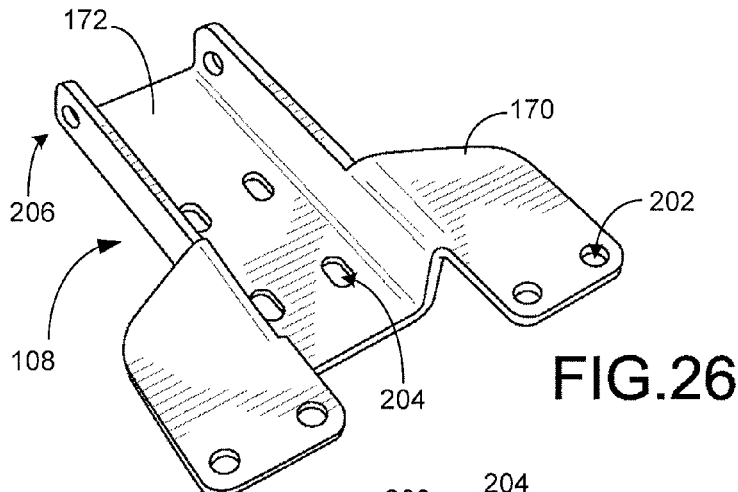
FIG. 26 is an isometric bottom view of a mounting bracket in accordance with various embodiments of the present disclosure.
Figure 27:
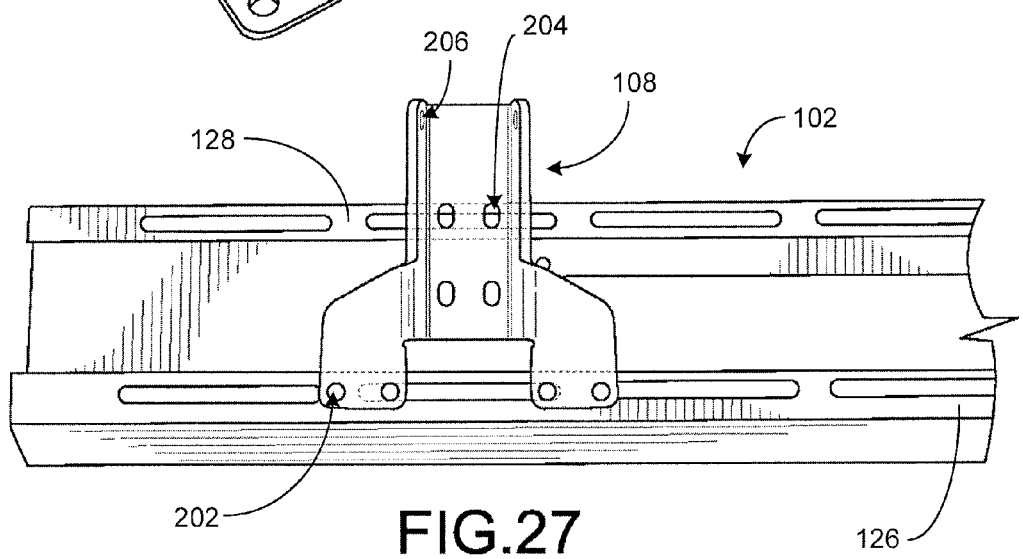
FIG. 27 is a bottom view of a rail adjacent a mounting bracket in accordance with various embodiments of the present disclosure.

FIGS. 26-27 show another exemplary mounting bracket 108. The first connection tab 170 may provide at least one aperture 202 for use with the front lip 126. The second connection tab 172 may provide at least one aperture 204 for use with the back lip 128. The mounting bracket 108 may provide at least one aperture 206 for use with the vehicle 10. Each of the apertures 202, 204, 206 may be used with suitable fastening elements, such as but not by way of limitation, a bolt and a nut. Of course, the apertures 202, 204, 206 are optional. The mounting bracket 108 may be fixedly attached to the rail 102 by suitable fastening elements that do not require an aperture, such as welding, by way of example and not limitation.

Figure 28:
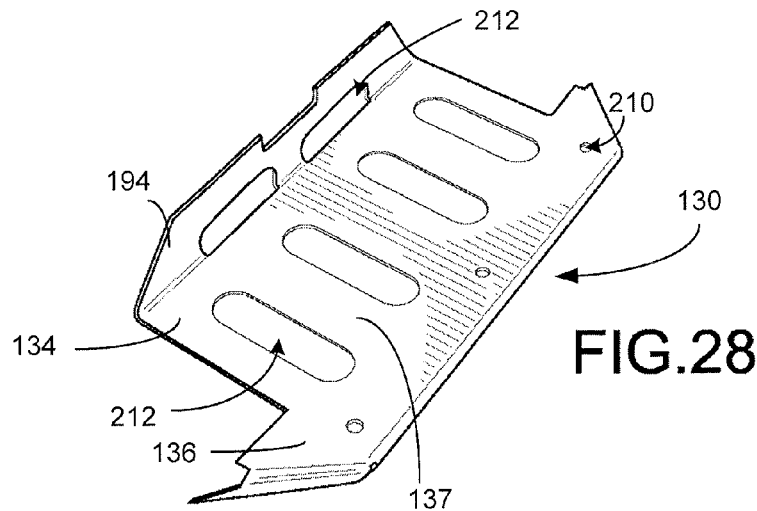
FIG. 28 is an isometric top view of a step pad support in accordance with various embodiments of the present disclosure.

FIGS. 28-31 show in various views exemplary embodiments of the present disclosure. FIG. 28 shows the step pad support 130 in which the medial step pad support portion 134 and the lateral step pad support portion 136 are continuous in a substantially planar surface 137. The substantially planar surface 137 is horizontal when the step pad support 130 is fixedly attached to the vehicle 10. The extension 194 of the medial step pad support portion 134 may be substantially perpendicular to substantially planar surface 137. Of course, other orientations of the extension 194 in relation to the substantially planar surface 137 are contemplated.

At least one aperture 210 in the lateral step pad portion 136 that is dimensioned and configured to receive the connection post 156 of the step pad 110 (not shown) may be present. Three apertures 210 are shown; however one, two, three, or more apertures 210 may be present. The apertures 210 may be arranged in a linear fashion, as shown, or in a non-linear fashion, as not shown.

At least one slat 212 may be provided by the step pad support 130. Four slats 212 are shown in the substantially planar surface 137; however, one, two, three, four, five, or more slats 212 may be present. The slats 212 may provide for drainage of material, such as but not limited to dirt, water, and mud, from the step pad support 130. Drainage of material may create a step pad support 130 that is cleaner. The slats 212 may reduce the amount of materially used to make the step pad support 130. The slats may also be present in the extension 194 of the medial step pad support portion 134.

Figure 29:
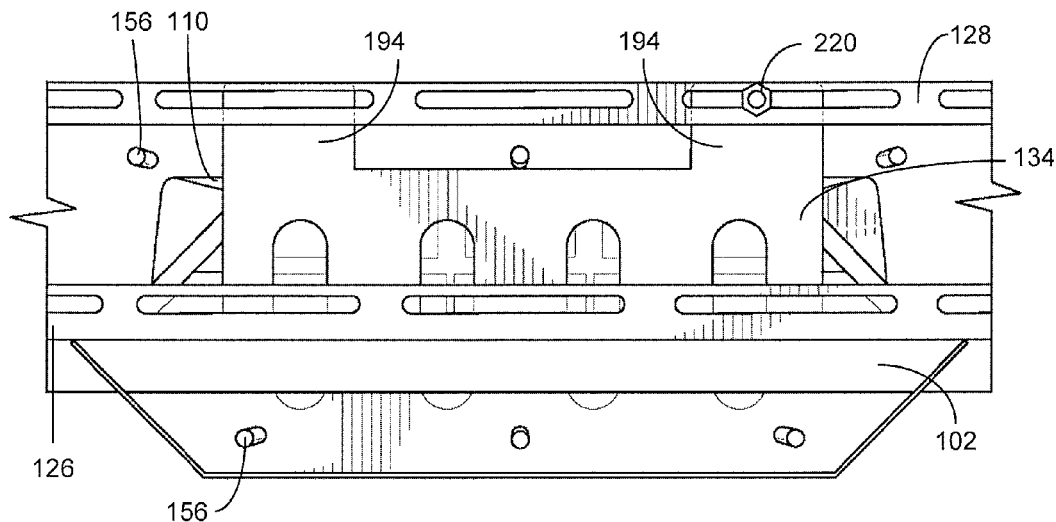
FIG. 29 is a bottom view of a side step in accordance with various embodiments of the present disclosure.
Figure 30:
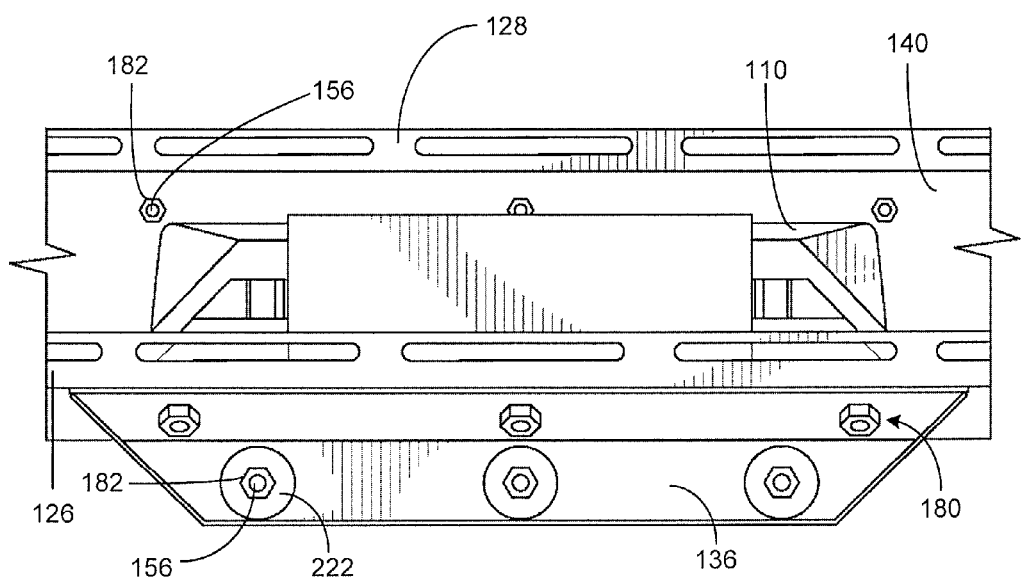
FIG. 30 is a bottom view of a side step in accordance with various embodiments of the present disclosure.
Figure 31:
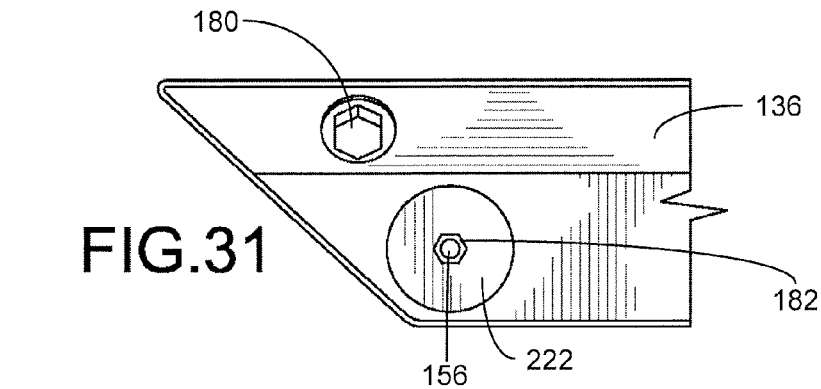
FIG. 31 is a bottom view of step pad support in accordance with various embodiments of the present disclosure.

FIGS. 29-31 show in bottom view further embodiments of the present disclosure. The step pad support 130 may have the extension 194 extend to the back lip 128. The extension 194 may be fixedly attached to the back lip 128 by any suitable fastening elements, two of which are shown by way of example and not limitation. The extension 194 may be welded, for example, to the back lip 128. When the side step 100 is fixedly attached to the vehicle 10, the extension 194 may be on top of the back lip 128, as shown, or the extension 194 may be on the bottom of the back lip 128, as not shown. The extension 194 may be fastened, for example by bolt and nut 220. The bolt and nut 220 may be in either of the two orientations are possible. The extension 194 and the back lip 128 may be in either of the two orientations possible between the bolt and nut 220.

The connection post 156 may be fixedly attached to the lateral step pad support portion 136 through fiction fit as shown in FIG. 29 or clip 182 and washer 222 as shown in FIG. 30. The clip 182 may be used without the washer 222 as shown previously in FIG. 23 and currently in FIG. 30. The washer 222 may also be used with the bolt and nut 180.

Figure 32:
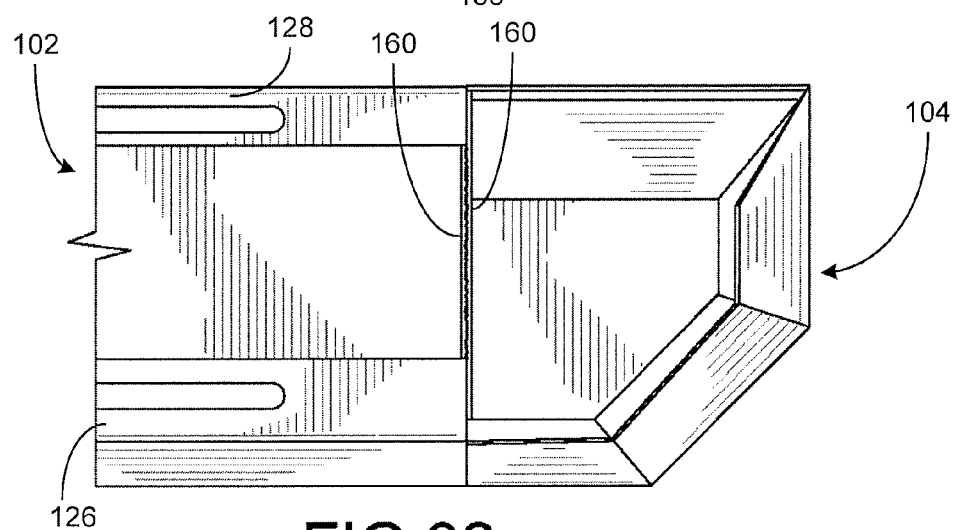
FIG. 32 is a bottom view of a rail and an end cap in accordance with various embodiments of the present disclosure.
Figure 33:
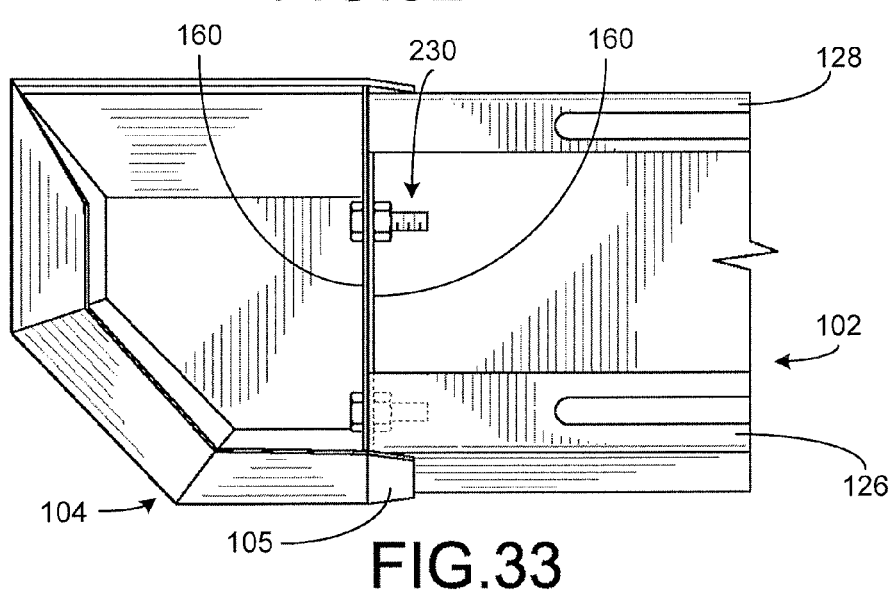
FIG. 33 is bottom view and an end cap in accordance with various embodiments of the present disclosure.

FIGS. 32-33 show in bottom view the end cap 104 fixedly attached to the rail 102. In FIG. 32, the end cap 104 meets flush with the rail 102. On the other hand, and FIG. 33, the end cap 104 overlaps the rail 102. An overlap portion 105 of the end cap 104 effectively hides any seam 107 that would otherwise be visible between the end cap 104 and the rail 102. Similarly, the joint cap 106 effectively can hide any seam 107 that would otherwise be visible between a pair of rails 102.

The end cap 104 and the rail 102 may be fixedly attached by any suitable fastening elements. FIG. 33 shows a fastener 230, such as but not by way of limitation, a bolt and nut. The fastener 230, such as the bolt and nut, may be in either of the two orientations possible. The fastener 230 may be used in FIG. 32 that shows the end cap 104 meeting flush with the rail 102, which is not shown, or the end cap 104 and the rail 102 may be fixedly attached by other fastening elements, such as but not limited to welding. While the connection portion 160 is present, or at least a portion thereof is present, in the end cap 104 and the rail 102 in order to use the fastener 230, one or both of the connection portions 160, or a portion thereof, may be absent from the end cap 104 and the rail 102 when the end cap 104 and the rail 102 are fixedly attached by some other fastening elements, such as welding by way of example and not limitation. The connection portion 160 does improve the structural integrity of the end cap 104 or the rail 102, so at least one connection portion 160 may be present where the end cap 104 and the rail 102 meet, for example.

Figure 34:
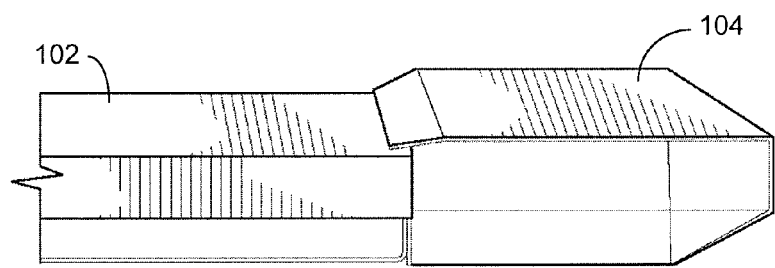
FIG. 34 is a back view of an end cap and a rail in accordance with various embodiments of the present disclosure.
Figure 35:
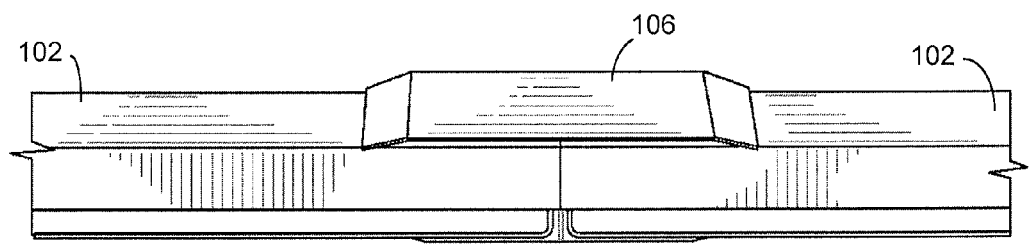
FIG. 35 is a back view of a joint cap and two rails in accordance with various embodiments of the present disclosure.

FIGS. 34-35 show in back view that the vertical surface 146 of the end cap 104 and the vertical surface 148 of the joint cap 106, respectively are optional. Eliminating the vertical surface 146 or the vertical surface 148 will reduce the amount of material required to make the side step 100, which may reduce costs. Furthermore, eliminating the vertical surface 146 may make manufacture of the side step 100 easier, because the opening between the top surface or the top back slanted surface of the end cap 104 will be bigger. Therefore, the end cap 104 may be easier to slide into position relative to the rail 102. Similarly, eliminating the vertical surface 148 may make manufacture of the side step 100 easier, because the opening peak between the top surface or the top back slanted surface of the joint 106 will be bigger. Therefore, the joint 106 may be easier to slide into position relative to the rail 102.

While the present disclosure has been described in connection with an exemplary embodiment, it is not intended to limit the scope of the present disclosure to the particular form set forth, but on the contrary, it is intended to cover such alternatives, modifications, and equivalents as may be included within the spirit and scope of the present disclosure as defined by the appended claims.

It will be clear that the present disclosure is well adapted to attain the ends and advantages mentioned as well as those inherent therein. While exemplary embodiments have been described for purposes of this disclosure, numerous changes may be made which will readily suggest themselves to those skilled in the art and which are encompassed by the appended claims.

What is claimed is:

1. An apparatus comprising:
 a support member configured for attachment to a vehicle, the support member includes, at least:
  a first connection guide rail that provides at least one first connection guide that is configured to connect to a mounting bracket, and
  a second connection guide rail that provides at least one second connection guide that is configured to connect to the mounting bracket, wherein the first connection guide rail is substantially lower to the ground than the second connection rail when the support member is fixedly attached to a vehicle, and the first connection guide rail is further from the vehicle than the second connection guide rail when the support member is fixedly attached to the vehicle; and
 a step pad recessed in the support member and protruding from the support member, wherein the step pad provides a traction surface to promote sure footing of a user stepping on the traction surface when the support member is attached to the vehicle.

2. The apparatus of claim 1, wherein the at least one first connection guide and the at least one second connection guide are two of a plurality of connection guides and at least a portion of the plurality of connection guides are apertures that cooperate with a plurality of apertures on the mounting bracket to fixedly attach the mounting bracket to the support member.

3. The apparatus of claim 1, further comprising:
 a step pad support recessed in the support member and protruding from the support member, wherein the step pad support provides support to a portion of the step pad.

4. The apparatus of claim 3, wherein the step pad support comprises a lateral step pad support portion configured to support a portion of the step pad that protrudes from the support member, the lateral step pad support portion is fixedly attached to the support member.

5. The apparatus of claim 1, wherein the mounting bracket is configured to fixedly attach the support member to the vehicle and configured to fixedly attach to the support member.

6. The apparatus of claim 5, wherein the mounting bracket comprises a universal connection end that is configured to facilitate connection of the mounting bracket to support member by a fastening element.

7. The apparatus of claim 6, wherein the fastening element comprises a bolt.

8. The apparatus of claim 6, wherein the fastening element comprises a weld.

9. An apparatus comprising:
 a support member configured for attachment to a vehicle, wherein the support member provides a first connection guide rail that provides a plurality of first connection apertures and a second connection guide rail that provides a plurality of second connection apertures, wherein the first connection guide rail is substantially lower to the ground than the second connection rail when the support member is fixedly attached to a vehicle, and the first connection guide rail is further from the vehicle than the second connection guide rail when the support member is fixedly attached to the vehicle;
 a mounting bracket configured to be fixedly attached to the support member at a first end of the mounting bracket and configured to be fixedly attached to the vehicle at an opposing second end of the mounting bracket; and
 a step pad recessed in the support member and protruding from the support member, wherein the step pad provides a traction surface to promote sure footing of a user stepping on the traction surface when the mounting bracket is fixedly attached to the vehicle.

10. The apparatus of claim 9, wherein the mounting bracket is fixedly attached to at least one of the plurality of first connection apertures with a first fastener and fixedly attached to at least one of the plurality of second connection apertures with a second fastener.

11. The apparatus of claim 9, wherein the step pad is custom positioned based on the properties of the vehicle to assist the user to access a passenger compartment upon connection of the support member with the vehicle.

12. The apparatus of claim 9, wherein the step pad is custom positioned based on the properties of the vehicle to assist the user to access a storage compartment upon connection of the support member with the vehicle.

13. An apparatus comprising:
 an elongated support member configured for attachment to a vehicle, wherein the support member provides a first connection guide rail that provides a plurality of first connection apertures and a second connection guide rail that provides a plurality of second connection apertures;
 a first step pad recessed in the elongated support member and protruding from the elongated support member, wherein the first step pad provides a first traction surface to promote sure footing of a user stepping on the first traction surface, such that the user can access a first passenger compartment of the vehicle when the user is assisted by the first step pad;
 a second step pad recessed in the elongated support member and protruding from the elongated support member, wherein the second step pad provides a second traction surface to promote sure footing of the user stepping on the second traction surface, such that when the user is assisted by the second step pad the user can access space selected from a group of a second passenger compartment of the vehicle and a storage area; and
 a plurality mounting brackets fixedly attached to the elongated support member through the first connection apertures and the second connection apertures to fixedly attach the elongated support member to the vehicle.

14. An apparatus comprising:
 a support member configured for attachment to a vehicle, wherein the support member provides a first connection guide rail that provides a plurality of first connection apertures and a second connection guide rail that provides a plurality of second connection apertures;

a mounting bracket configured to be fixedly attached to the support member at a first end of the mounting bracket and configured to be fixedly attached to the vehicle at an opposing second end of the mounting bracket;

a step pad recessed in the support member and protruding from the support member, wherein the step pad provides a traction surface to promote sure footing of a user stepping on the traction surface when the mounting bracket is fixedly attached to the vehicle; and a step pad support recessed in the support member and protruding from the support member, wherein the step pad support provides support to a portion of the step pad that protrudes from the support member.

15. The apparatus of claim 14, wherein the mounting bracket is fixedly attached to at least one of the plurality of first connection apertures with a first fastener and fixedly attached to at least one of the plurality of second connection apertures with a second fastener.

16. The apparatus of claim 14, wherein the step pad is custom positioned based on the properties of the vehicle to assist the user to access a passenger compartment upon connection of the support member with the vehicle.

17. The apparatus of claim 14, wherein the step pad is custom positioned based on the properties of the vehicle to assist the user to access a storage compartment upon connection of the support member with the vehicle.

18. An apparatus comprising:

a support member configured for attachment to a vehicle, wherein the support member provides a first connection guide rail that provides a plurality of first connection apertures and a second connection guide rail that provides a plurality of second connection apertures;

a mounting bracket configured to be fixedly attached to the support member at a first end of the mounting bracket and configured to be fixedly attached to the vehicle at an opposing second end of the mounting bracket, wherein the first end of the mounting bracket comprises a universal connection end that is configured to facilitate connection of the mounting bracket to the support member by a fastening element, wherein the mounting bracket is custom positioned in relation to the first connection guide rail and the second connection guide rail based on properties of a vehicle to which the support member and mounting bracket are fixedly attached; and a step pad recessed in the support member and protruding from the support member, wherein the step pad provides a traction surface to promote sure footing of a user stepping on the traction surface when the mounting bracket is fixedly attached to the vehicle.

19. The apparatus of claim 18, wherein the mounting bracket is fixedly attached to at least one of the plurality of first connection apertures with a first fastener and fixedly attached to at least one of the plurality of second connection apertures with a second fastener.

20. The apparatus of claim 18, wherein the step pad is custom positioned based on the properties of the vehicle to assist the user to access a passenger compartment upon connection of the support member with the vehicle.

21. The apparatus of claim 18, wherein the step pad is custom positioned based on the properties of the vehicle to assist the user to access a storage compartment upon connection of the support member with the vehicle.

* * * * *